(12) United States Patent
White et al.

(10) Patent No.: US 10,752,063 B2
(45) Date of Patent: Aug. 25, 2020

(54) TIRE BEAD HOLDING PLIERS

(71) Applicants: Bosch Automotive Service Solutions Inc., Warren, MI (US); Robert Bosch GmbH, Stuttgart (DE)

(72) Inventors: Michael White, Montgomery City, MO (US); Robert J. Kochie, Dodge Center, MN (US); Robert Jensen, Clarks Grove, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 1015 days.

(21) Appl. No.: 14/977,229

(22) Filed: Dec. 21, 2015

(65) Prior Publication Data

US 2017/0174018 A1 Jun. 22, 2017

(51) Int. Cl.
*B60C 25/02* (2006.01)
*B25B 7/02* (2006.01)
*B25B 7/12* (2006.01)
*B25B 27/00* (2006.01)
*B60C 25/00* (2006.01)

(52) U.S. Cl.
CPC ............... *B60C 25/02* (2013.01); *B25B 7/02* (2013.01); *B25B 7/123* (2013.01); *B25B 27/0035* (2013.01); *B60C 25/00* (2013.01)

(58) Field of Classification Search
CPC ........... B60C 25/02; B60C 25/01; B25B 7/02; B25B 7/123; B25B 7/12
USPC ....................... 81/418, 419, 426.5
See application file for complete search history.

(56) References Cited

U.S. PATENT DOCUMENTS

| 3,908,490 A | * | 9/1975 | Durham | .................... B25B 7/02 |
| | | | | 81/420 |
| 4,149,435 A | * | 4/1979 | Smith | ...................... B25B 7/02 |
| | | | | 81/426 |
| 2014/0060753 A1 | * | 3/2014 | White | .................... B60C 25/01 |
| | | | | 157/5 |

* cited by examiner

*Primary Examiner* — David B. Thomas
(74) *Attorney, Agent, or Firm* — Maginot, Moore & Beck LLP

(57) ABSTRACT

Tire bead holding pliers includes a first jaw having a lipped plate configured to engage an outboard side of a wheel rim to locate the pliers, and a second jaw defined by a first and second hook and configured to curve around the wheel rim, move toward the first jaw, and engage an inboard side of the wheel rim as the pliers are tightened. The first hook has a first concave portion facing away from the first jaw and configured to receive a bead. The second hook extends from the first hook opposite the first concave portion, has a second concave portion facing the first jaw, and clamps the wheel rim therebetween. During tire installation or removal, the bead is hooked onto the second jaw, which holds the bead in place during the operation in a hands-free fashion.

16 Claims, 4 Drawing Sheets

TIRE BEAD HOLDING PLIERS

TECHNICAL FIELD

This disclosure relates generally to automotive tools, and, more particularly, to tools for installing and removing tires from wheel rims.

BACKGROUND

Installing and removing tires from wheel rims is a common task performed by auto and truck mechanics. Modern tires may be difficult to install or remove from wheel rims as modern tires have increasingly stiff side walls, which must be flexed in to order for the tires to fit over the wheel rim. The physical connection between a wheel rim and a tire is referred to as a bead. Forming the bead when mounting tires to the wheel rims, especially when manually mounting tires by hand, may be difficult. In particular, tires and wheel rims for larger vehicles such as trucks or agricultural vehicles are larger, stiffer, and heavier. Large tires also tend to move relative to wheel rims during installation/removal, which can interfere with formation of the bead.

Several tools are used by mechanics to assist with manipulating the bead of a tire during an installation/ removal operation. One common tool is referred to as a tire spoon, which is wedged in between the bead of the tire and the wheel rim in order to pry the tire apart from the wheel rim during a removal process, and seat the bead on the wheel rim during an installation process. A tire spoon provides leverage and gripping force for manipulating the bead, but does not hold the tire in place relative to the wheel rim.

Tools have also been developed to address this difficulty. U.S. Patent Application Publication No. 2014/0060753 entitled "Tire bead wedge pliers," the disclosure of which is incorporated by reference herein in its entirety, discloses a tire mounting tool configured to maintain a tire with respect to a wheel during a tire mounting process. The tool includes a wheel holding portion mounted on a handle, such as jaws that clamp on to the rim of a wheel and that are mounted on handles of a pair of pliers, and a tire holding portion that is configured to limit motion of a tire relative to the rim of the wheel. The tire holding portion is a member that extends out from one of the handles so that it extends away from the rim of the wheel when the wheel holding portion is mounted on the rim. The tire holding portion then acts as a stop to substantially prevent the tire from moving or limit a range of vertical movement of the tire. Once the Tire Bead Wedge Pliers are installed, a tire spoon can be used to guide the bead during the remainder of the operation.

However, the tire holding portion of the tool, by extending out from the handle, may increase the difficulty of manipulating the tool and mounting the tool on the wheel, and also increases the weight, complexity, and cost of the tool. Additionally, the tire holding portion may be insufficient to restrain larger tires that may weigh more than the tire holding portion can support or that may flex and move despite the support of the tire holding portion. Therefore, what is needed is a tire bead holding tool that is easy to manipulate and operate, and that holds the bead of a tire in place relative to a wheel rim during an installation/removal operation.

SUMMARY

In order to facilitate holding a bead of a tire in place during a tire removal or installation operation, tire bead holding pliers according to this disclosure include a handle portion, and a first and second jaw configured to clamp a wheel rim therebetween. The handle portion can be any acceptable type of plier handles, and in one embodiment includes a locking mechanism operable to lock the first and second jaws in place.

In an embodiment, the first jaw ends in a flat plate with a lip on an inner end thereof. The flat plate is oriented so that a plane of the flat plate is substantially perpendicular to a plane of the pliers. The flat plate and lip together are configured to engage an outboard side of the wheel rim to locate the pliers relative to the wheel rim. The second jaw has a double hook shape. On a side of the second jaw facing away from the first jaw, the second jaw includes a concave portion and a convex portion extending from the concave portion to the end of the jaw, the concave and convex portions together forming a first hook. On a side of the second jaw facing the first jaw, the second jaw further includes a second concave portion that extends from the first hook and defines a second hook. The second hook, together with the flat plate, defines a region between the first and second jaws for receiving the wheel rim. As the pliers are tightened on the wheel rim, the second jaw moves toward the first jaw so that the wheel rim is clamped between the flat plate and the second concave portion.

During a tire removal operation, the bead of the tire is hooked onto the first hook of the second jaw, which holds the bead of the tire in place during the operation in a hands-free fashion. The first hook holds the bead away from the wheel rim to enable a bead manipulation tool to be inserted therein. During an installation operation, the convex portion of the second jaw holds the bead of the tire in position over the drop center of the wheel rim.

In an embodiment, at least a portion of each of the first jaw and second jaw is coated with a material coating. In one embodiment, the material coating includes a rubber, and the first and second jaws include a metal. The material coating increases a width of at least the second jaw, and is configured to deter at least one of scratching of the wheel rim, tearing of the bead of the tire, and sliding of the pliers on the wheel rim.

This summary is intended only to introduce subject matter pertaining to a bushing service tool which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
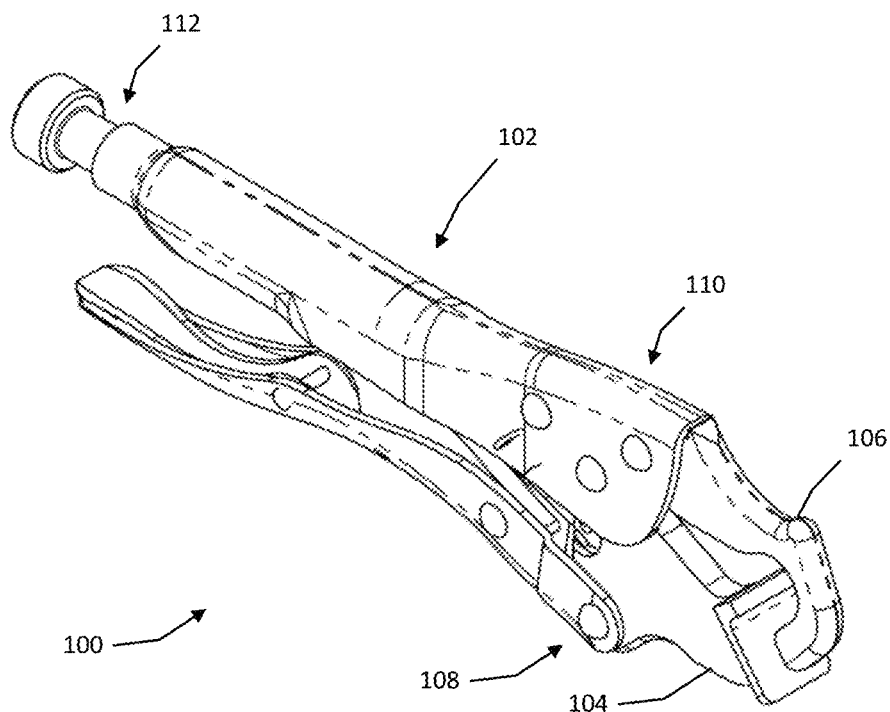
FIG. 1 is a perspective view of an exemplary embodiment of tire bead holding pliers according to this disclosure.
Figure 2:
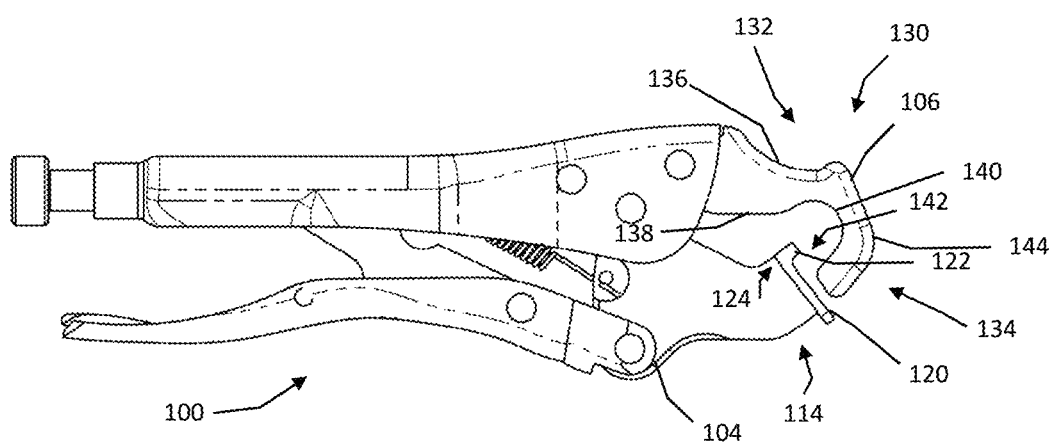
FIG. 2 is a side view of the pliers of FIG. 1.
Figure 3:
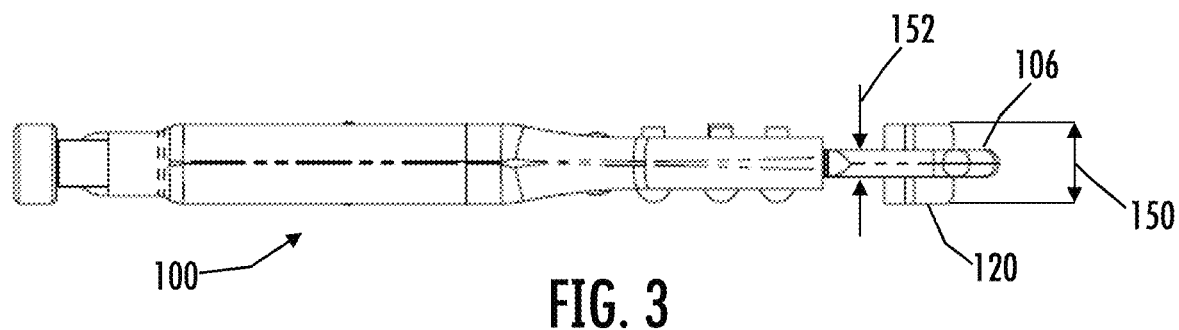
FIG. 3 is a top view of the pliers of FIG. 1.

FIG. 1 illustrates a perspective view of an exemplary embodiment of a pair of tire bead holding pliers 100 according to this disclosure. FIG. 2 is a side view and FIG. 3 is a top view of the pliers 100 from FIG. 1. As illustrated in FIG. 1, the pliers 100 include a handle portion 102, a first jaw 104, and a second jaw 106.

The handle portion 102 includes jaw connection regions 108 and 110 that respectively mount the first jaw 104 and second jaw 106 onto the handle portion 102. In this embodiment, the handle portion 102 is similar to the handle portion of a pair of locking pliers, and includes a locking mechanism 112 operable to fix the jaws 104 and 106 in place. The connection regions 108 and 110 illustrated in FIG. 1 include a plurality of rivets that pivotably connect the jaws 104 and 106 to the handle portion 102, and a spring member connected to the first jaw 104. However, in other embodiments, any acceptable type of pliers handle portion and connection region can be used, and thus are not described in further detail herein.

Unlike conventional tire bead holding pliers that include a member extending out from the handle portion of the pliers for holding a tire in place, the pliers 100 according to this disclosure includes jaws 104 and 106 which are configured to both grip the wheel rim and hold the tire bead in place, and thus a separate tire holding member can be dispensed with.

As shown in FIG. 2, the first jaw 104, in an operative end region 114, includes a flat plate 120 and a lip 122 extending out from an inside end 124 of the flat plate 120. The flat plate 120 is oriented so that a plane of the flat plate 120 is substantially perpendicular to a plane of the pliers 100. The lip 122 extends out from the flat plate 120 away from the first jaw 104 in a direction substantially normal to the plane of the flat plate 120. The flat plate 120 and lip 122 are configured to engage an outboard side of a wheel rim in order to locate the pliers 100 relative to the wheel rim.

The second jaw 106 has a double hook shape 130 defined by a first hook 132 and a second hook 134, and is configured to engage an inboard side of the wheel rim and cooperate with the first jaw 104 to clamp the wheel rim therebetween.

The first hook 132 includes a first concave portion 136 and a surface 138. The first concave portion 136 is on an outer side of the first hook 132 facing away from the first jaw 104, and is configured to receive a bead of a tire, and the surface 138 is opposite the first concave portion 136 and faces toward the first jaw 104. The first concave portion 136 is further configured to hold a portion of the bead of the tire away from the wheel rim to enable a tire bead manipulation tool to be inserted therebetween.

The second hook 134 extends from the surface 138 toward the flat plate 120 of the first jaw 104, and includes a second concave portion 140. The second concave portion 140 faces toward the first jaw 104, and together with the flat plate 120 forms a region 142 for receiving a wheel rim.

In this embodiment, the second hook 134 further includes a convex portion 144 extending from the first hook and facing away from the second concave portion 140. The convex portion 144 is configured to support the bead of the tire during a tire installation operation. The convex portion 144 is also spaced apart from the first hook 132, in order to space the tire apart from the wheel rim.

As shown in the top view of FIG. 3, the flat plate 120 has a width 150 that is greater than a width 152 of the second jaw 106. A remainder of the first jaw 104 other than the flat plate 120 (not shown in FIG. 3, see FIG. 2) and the second jaw 106 can be any width that is acceptable for mounting in the handle portion of a pair of pliers, and in this embodiment are approximately ¼ inches wide. The flat plate 120 is configured to distribute a clamping load of the pliers 100 over a larger surface area of a wheel rim than would otherwise be contacted by the narrower width of the remainder of the first jaw 104. In this embodiment, the flat plate 120 is approximately 1 inch wide, but any acceptable width can be used.

The first jaw 104 and second jaw 106 can be formed via any acceptable manufacturing process, such as via a stamping, machining, etc. In one example, the first jaw 104 and second jaw 106 can be formed from a common stamping process, and the flat plate 120 can be subsequently disposed onto the first jaw 104. The flat plate 120 can be integrally formed with the first jaw 104, can be joined thereto such as via a welding or bonding process, or can be affixed thereto via any acceptable connection such as a rivet, bolt, etc. The first jaw 104 and second jaw 106 can be formed from any acceptable material, such as a metal, composite, ceramic, plastic, etc. In this embodiment, the first jaw 104 and second jaw 106 are formed from steel.

In some instances, the relatively narrow width 152 of the second jaw 106 may result in material of a tire being torn, or material of the wheel rim being scratched while engaged with the pliers 100. Additionally, even once the pliers 100 are clamped onto a wheel rim, large forces encountered during a tire mounting operation may cause the first jaw 104 and/or second jaw 106 to slide on the surface of the wheel rim, causing the tire to move relative to the wheel rim. Therefore, configuring the jaws 104 and 106 to at least one of deter tearing the tire material, deter scratching the wheel rim, and deter sliding of the jaws 104 and 106 on the wheel rim would be beneficial.

In another embodiment (not shown) the second jaw 106 has a wider width. For example, the second jaw 106 can be about half as wide as the flat plate 120, or about as wide as the flat plate, or can include a further flat plate that forms a widened end.

Figure 4:
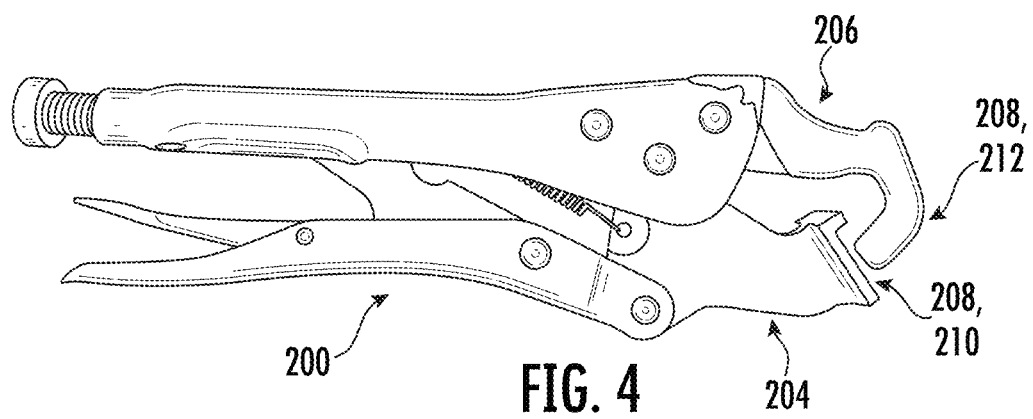
FIG. 4 is a side image of another exemplary embodiment of tire bead holding pliers according to this disclosure.

FIG. 4 illustrates an image of another exemplary embodiment of a pair of tire bead holding pliers 200 according to this disclosure. In this embodiment, at least a portion of each of the first jaw 204 and second jaw 206 includes a material coating 208 configured to deter at least one of tearing of tire material, scratching of a wheel rim, and sliding of the jaws 204 and 206 on the wheel rim.

The material coating 208 is configured to increase a width of the operative portions 210 and 212 of the first jaw 204 and second jaw 206, respectively. The increased width distributes the operative forces of the pliers 200 over a larger area of the tire, and thus deters tearing of the tire material. The material coating 208 is also configured to engage the wheel rim in order to deter scratching and sliding on the wheel rim.

Figure 5:
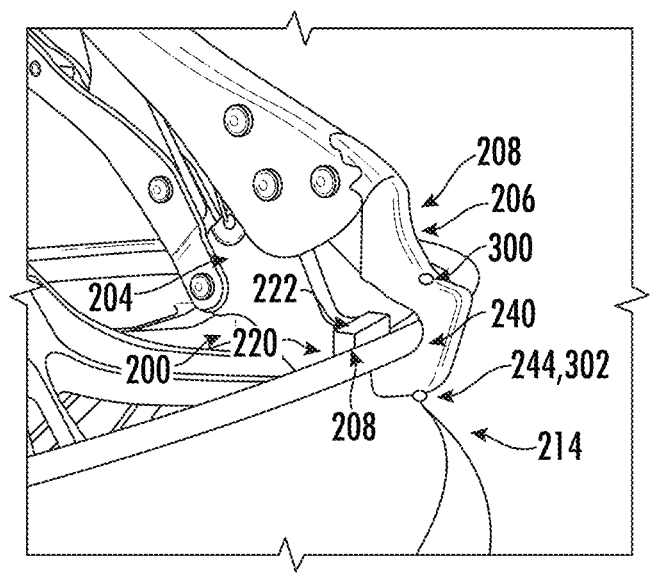
FIG. 5 is a perspective image of the pliers of FIG. 4 in use engaged with a wheel rim.

FIG. 5 illustrates an image of the pliers 200 engaged with a wheel rim 214. In FIG. 5, the lip 222 and flat plate 220 of the first jaw 204 are engaged with the wheel rim 214, with the flat plate 220 bearing against an inner side of the wheel rim 214 and the lip 222 resting on the edge of the wheel rim 214 so as to locate the pliers 200 relative to the wheel rim 214. The second concave portion 240 is engaged with an outside surface of the wheel rim 214 to clamp the wheel rim 214 between the first jaw 204 and second jaw 206. As illustrated in FIG. 5, the surfaces of the flat plate 220, lip 222, and concave portion 240 that are in contact with the wheel rim 214 are coated with the material coating 208. Additionally, the first concave portion 236 and the convex portion 244, which are configured to engage and support the material forming the bead of the tire, are coated with the material coating 208.

The material coating 208 is configured to have a lower hardness than the material of the wheel rim 214 in order to deter scratching. The material coating is also configured to frictionally engage the wheel rim 214 in order to deter sliding.

In the embodiment illustrated in FIGS. 4 and 5, the material coating 208 is formed from an elastic material such as a rubber material, but any acceptable material can be used. In one embodiment, the material coating 208 is applied via a dipping procedure, whereby the jaws 204 and 206 are dipped into liquefied material which is then dried to form the material coating 208. In one embodiment, the dipping procedure is performed after the first jaw 204 and second jaw 206 have been mounted into the pliers 200, so that both jaws 204 and 206 can be coated via a single dipping operation. In another embodiment, the first jaw 204 and second jaw 206 are dipped prior to being mounted in the pliers 200.

In one embodiment, the material coating 208 is applied via a spray-coating operation. In a further embodiment, material coating sections are formed separately from the pliers 200, and are then affixed to the jaws 204 and 206 via adhesive bonding, welding, connecting members, a form fit connection, or any other acceptable type of connection.

The tire bead holding pliers 100, 200 can be used during a tire removal operation and during a tire installation operation.

Figure 6:
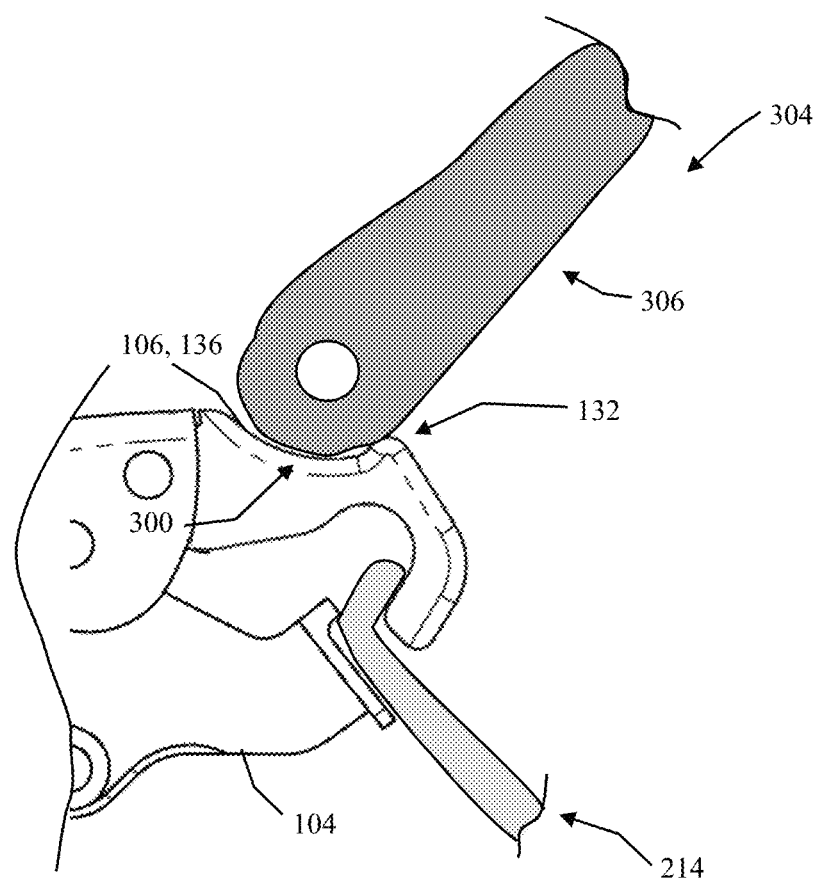
FIG. 6 is a side detail view of the pliers of FIG. 1 in use with a wheel rim and a tire during a tire removal operation.

FIG. 6 illustrates a detail side view of the jaws 104 and 106 of FIG. 1 in use clamped on a wheel rim 214 during a tire removal operation.

In a tire removal operation, the bead of the tire is initially seated on the wheel rim. The bead of the tire is broken, such as by hand, via a tire spoon, or via any other acceptable bead breaking device. In an example, two tire spoons can be used to pry the tire away from the wheel rim in order to produce a space between the two tire spoons where the wheel rim is exposed from the tire in which the pliers 100, 200 can be set.

Once the bead is broken, the pliers 100, 200 are located relative to the wheel rim by setting the flat plate 120, 220 against the outboard side of the wheel rim and resting the lip 122, 222 of the first jaw 104, 204 on the edge of the wheel rim. As the pliers 100, 200 are tightened, such as via user operating the handle portion 102, 202 of the pliers 100, 200, the second jaw 106, 206 curves around the wheel rim and moves toward the flat plate 122, 222 until the second concave portion 140, 240 engages an inboard side of the wheel rim and cooperates with the flat plate 122, 222 to clamp the wheel rim therebetween.

With the pliers 100, 200 clamped onto the wheel rim, the pliers 100, 200 can be locked in place, such as via operating the locking mechanism 112 to fix the jaws 104, 204 and 106, 206 in place relative to each other. The bead of the tire is then pulled up and hooked onto the first hook 132 formed by the first concave portion 136 and convex portion 144.

As shown in FIG. 6, the bead 306 of a tire 304 is hooked in on the first hook 132 of the second jaw 106, whereby a portion of the bead 306 is held at 300 in the concave portion 136.

In a conventional tire removal operation, a user needed to continuously manipulate a tool such as a tire spoon in order to keep the bead of the tire in position relative to the wheel rim 214. In contrast, with the pliers 100, clamped onto the wheel rim 214 and the bead 306 of the tire 304 hooked onto the first hook 132, the bead 306 is held in place in a hands-free fashion and without the aid of any additional tools.

With the bead 306 of the tire 304 held in place on the first hook 132, the remainder of the bead extending circumferentially around the tire can be removed from the wheel rim 214, such as by manipulating a tire spoon around the circumferences of the wheel rim 214 and the tire 304.

As shown in FIG. 5, the material coating 208 is configured to frictionally engage the wheel rim 214 to help hold the pliers 100, 200 in place while the bead of the tire is manipulated, and the material coating 208 also distributes forces acting between the second hook 134 and the tire in order to deter tearing of the material of the tire while the bead is being manipulated. Once the tire has been removed from the wheel rim, the locking mechanism 112 can be disengaged, and the pliers 100, 200 are removed from the wheel rim.

Figure 7:
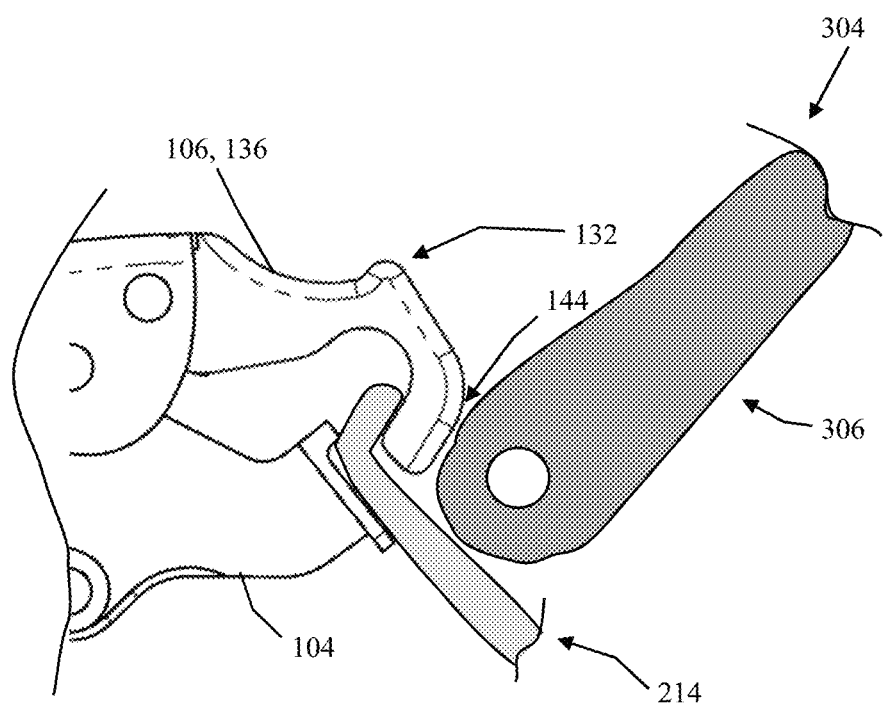
FIG. 7 is a side detail view of the pliers of FIG. 1 in use with a wheel rim and a tire during a tire installation operation.

FIG. 7 illustrates a detail side view of the jaws 104 and 106 of FIG. 1 in use clamped on a wheel rim 214 during a tire installation operation.

In a tire installation operation, a tire is partially disposed over the wheel rim such that the bead of the tire is outside of the wheel rim. The pliers 100, 200 are clamped onto the wheel rim in the manner described above, and the bead of the tire is hooked into the convex portion 144 of the second jaw 106.

In a conventional tire installation operation, it may be difficult keeping the bead of the tire properly positioned over the drop center of the wheel rim, i.e., a portion of the wheel rim 214 configured to receive one bead of the tire while the other bead is being manipulated over the edge of the wheel rim. If the tire becomes displaced from the drop center during an installation operation, the tire may not be properly seated on the wheel rim. Conversely, according to this disclosure, once the bead of the tire is hooked onto the convex portion 144, the convex portion 144 holds the bead 306 of the tire 304 so that the tire 304 remains centered over the drop center of the wheel rim 214. The remainder of the bead can then be manipulated, such as via hand or via a tire spoon or other device, to seat the bead of the tire on the wheel rim 214. Once the bead 306 of the tire 304 is seated on the wheel rim 214, the pliers 100, 200 are removed from the wheel rim 214.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

It is claimed:

1. Tire bead holding pliers, comprising:
    a first jaw that includes a flat plate configured to engage an outboard side of a wheel rim to locate the pliers relative to the wheel rim; and
    a second jaw having a double hook shape defined by:
        a first hook having a first concave portion facing away from the first jaw and configured to hook a bead of a tire, the first concave portion having a contour that substantially matches an end of the bead of the tire such that, when the bead of the tire is hooked by the first concave portion of the first hook, the end of the bead of the tire is held within the substantially matching contour; and a second hook extending from a surface of the first hook opposite the first concave portion toward the flat plate so as to form a ridge between the first hook and the second hook, and having a second concave portion facing toward the first jaw that together with the flat plate forms a region for receiving the wheel rim such that when the pliers are tightened on the wheel rim, the second jaw curves around an inboard side of the wheel rim and cooperates with the flat plate to clamp the wheel rim therebetween.

2. The pliers of claim 1, wherein the first hook of the second jaw is configured to hold a portion of the bead away from the wheel rim to enable a tire mounting tool to be inserted therein.

3. The pliers of claim 1, further comprising a material coating over at least a portion of each of the first jaw and second jaw configured to deter at least one of scratching the wheel rim and tearing the bead of the tire.

4. The pliers of claim 3, wherein the first jaw and the second jaw include a metal, and the material coating includes a rubber.

5. The pliers of claim 1, wherein the pliers are locking pliers.

6. The pliers of claim 1, wherein the second hook has a convex portion extending from the first hook and facing away from the second concave portion.

7. The pliers of claim 6, wherein the convex portion is configured to hold the bead of the tire in a drop center of the wheel rim during a tire installation operation to enable a tire mounting tool to be inserted between the bead of the tire and the wheel rim.

8. The pliers of claim 1, wherein the flat plate includes a lip at an inside end thereof that extends in a direction substantially normal to a plane of the flat plate toward the second jaw, the lip and the flat plate together configured to receive an edge of the wheel rim to locate the pliers relative to the wheel rim.

9. Tire bead holding pliers, comprising:
a first jaw that includes a flat plate configured to engage an outboard side of a wheel rim to locate the pliers relative to the wheel rim; and
a second jaw configured to engage an inboard side of the wheel rim and cooperate with the first jaw to clamp the wheel rim therebetween,
the second jaw having an outer side facing away from the first jaw that includes a concave portion and a convex portion extending from the concave portion to an end of the second jaw so as to form a ridge between the concave portion and the convex portion,
the concave portion and convex portion together forming a first hook configured to hook a bead of a tire when the wheel rim is clamped between the first jaw and the second jaw, and
the concave portion having a contour that substantially matches an end of the bead of the tire such that, when the bead of the tire is hooked by the concave portion of the first hook, the end of the bead of the tire is held within the substantially matching contour.

10. The pliers of claim 9, wherein:
the second jaw further has an inner side facing toward the first jaw; and
the inner side is concave and forms a second hook together with the convex portion that defines a region for receiving the wheel rim between the first jaw and the second jaw, the second hook configured to curve around the wheel rim as the pliers are tightened on the wheel rim.

11. The pliers of claim 9, further comprising a material coating over at least a portion of each of the first jaw and second jaw configured to deter at least one of scratching the wheel rim and tearing the bead of the tire.

12. The pliers of claim 11, wherein the first jaw and the second jaw include a metal, and the material coating includes a rubber.

13. The pliers of claim 9, wherein the first hook of the second jaw is configured to hold a portion of the bead away from the wheel rim to enable a tire mounting tool to be inserted therein.

14. The pliers of claim 9, wherein the convex portion is configured to move the bead of the tire in a drop center of the wheel rim during a tire installation operation to enable a tire mounting tool to be inserted between the bead of the tire and the wheel rim.

15. The pliers of claim 9, wherein the pliers are locking pliers.

16. The pliers of claim 9, wherein the flat plate includes a lip at an inside end thereof that extends in a direction substantially normal to a plane of the flat plate toward the second jaw, the lip and the flat plate together configured to receive an edge of the wheel rim to locate the pliers relative to the wheel rim.

* * * * *